(12) United States Patent
Mulholland

(10) Patent No.: US 8,975,313 B2
(45) Date of Patent: Mar. 10, 2015

(54) POLYMER COMPOSITION FOR PRODUCING ARTICLES HAVING A METALLIC APPEARANCE

(71) Applicant: Ticona LLC, Florence, KY (US)

(72) Inventor: Bruce M. Mulholland, Hebron, KY (US)

(73) Assignee: Ticona LLC, Florence, KY (US)

( * ) Notice: Subject to any disclaimer, the term of this patent is extended or adjusted under 35 U.S.C. 154(b) by 203 days.

(21) Appl. No.: 13/630,821

(22) Filed: Sep. 28, 2012

(65) Prior Publication Data

US 2013/0085214 A1 Apr. 4, 2013

Related U.S. Application Data

(60) Provisional application No. 61/460,778, filed on Sep. 29, 2011.

(51) Int. Cl.
| | | |
|---|---|---|
| C08K 5/34 | (2006.01) | |
| C08K 5/3475 | (2006.01) | |
| C08K 3/10 | (2006.01) | |
| C08L 59/02 | (2006.01) | |
| C08L 59/04 | (2006.01) | |
| C08K 3/08 | (2006.01) | |

(52) U.S. Cl.
CPC ............. *C08K 5/3475* (2013.01); *C08L 59/02* (2013.01); *C08L 59/04* (2013.01); *C08K 3/08* (2013.01); *C08K 2003/0812* (2013.01)
USPC .............. 524/91; 524/233; 524/386; 524/437

(58) Field of Classification Search
CPC ............. C08K 5/3475; C08K 2003/0812; C08L 59/00; C08L 59/04; C08L 59/02; C08L 71/02
USPC .................... 524/91, 233, 386, 437
See application file for complete search history.

(56) References Cited

U.S. PATENT DOCUMENTS

| | | |
|---|---|---|
| 2,772,247 A | 11/1956 | Schroeder |
| 3,204,014 A | 8/1965 | Green |
| 3,448,178 A | 6/1969 | Flanagan |
| 4,526,921 A | 7/1985 | Sakurai et al. |
| 4,544,600 A | 10/1985 | Kern |
| 4,607,075 A | 8/1986 | Baum et al. |
| 4,624,983 A | 11/1986 | Jarzombek et al. |
| 4,672,083 A | 6/1987 | Amann et al. |
| 4,731,397 A | 3/1988 | Auerbach et al. |
| 4,810,733 A | 3/1989 | Sakuma et al. |
| 5,043,398 A | 8/1991 | Auerbach et al. |
| 5,096,951 A | 3/1992 | Auerbach |
| 5,218,041 A | 6/1993 | Arnoldi et al. |
| 5,338,815 A | 8/1994 | Aizawa et al. |
| 5,407,996 A | 4/1995 | Aizawa et al. |
| 5,455,042 A | 10/1995 | Sakai et al. |
| 5,538,761 A | 7/1996 | Taylor |
| 6,051,660 A | 4/2000 | Oka |
| 6,165,407 A | 12/2000 | Tahara et al. |
| 6,306,940 B1 | 10/2001 | Disch et al. |
| 6,365,704 B1 | 4/2002 | Okawa et al. |
| 6,398,861 B1 | 6/2002 | Knox |
| 6,399,699 B1 | 6/2002 | Tanigawa et al. |
| 6,512,047 B2 | 1/2003 | Kim et al. |
| 6,627,691 B2 | 9/2003 | Mowrey et al. |
| 6,642,289 B2 | 11/2003 | Harashina et al. |
| 6,646,038 B1 | 11/2003 | Ali |
| 6,699,923 B2 | 3/2004 | Tanigawa et al. |
| 6,753,406 B2 | 6/2004 | Wulf et al. |
| 6,770,340 B2 | 8/2004 | Zumbrunnen et al. |
| 7,041,718 B2 | 5/2006 | Harashina et al. |
| 7,070,624 B2 | 7/2006 | Holmes, III et al. |
| 7,183,340 B2 | 2/2007 | Harashina et al. |
| 7,186,766 B2 | 3/2007 | Harashina et al. |
| 7,365,135 B2 | 4/2008 | Yang et al. |
| 7,390,842 B2 | 6/2008 | Kieser et al. |
| 7,442,742 B1 | 10/2008 | Smink et al. |
| 7,449,239 B2 | 11/2008 | Seeger et al. |
| 7,488,764 B2 | 2/2009 | Hobbs et al. |
| 7,521,016 B2 | 4/2009 | Kayano et al. |
| 8,034,855 B2 | 10/2011 | Asai et al. |
| 2003/0162912 A1 | 8/2003 | Disch et al. |
| 2004/0063853 A1 | 4/2004 | Disch et al. |
| 2005/0119370 A1 | 6/2005 | Paul et al. |
| 2007/0027300 A1 | 2/2007 | Zirer et al. |
| 2007/0105989 A1 | 5/2007 | Disch et al. |
| 2008/0242800 A1 | 10/2008 | Disch et al. |
| 2008/0249224 A1 | 10/2008 | Seeger et al. |
| 2008/0286472 A1 | 11/2008 | Tutin et al. |
| 2008/0287580 A1 | 11/2008 | Disch et al. |
| 2010/0261817 A1* | 10/2010 | Asai et al. ................ 524/99 |
| 2010/0280156 A1 | 11/2010 | Hase |
| 2011/0034610 A1 | 2/2011 | Mulholland |
| 2013/0035416 A1 | 2/2013 | Horio et al. |
| 2013/0078481 A1 | 3/2013 | Gronner et al. |

FOREIGN PATENT DOCUMENTS

| | | |
|---|---|---|
| CN | 101130619 | 2/2008 |
| EP | 0882763 A1 | 12/1998 |

(Continued)

OTHER PUBLICATIONS

Marplex (IUPITAL Acetal Copolymer F20, Nov. 2000, 2 pages).
Search Report for International Application No. PCT/US2012/057874, dated Dec. 13, 2012.

*Primary Examiner* — Kriellion Sanders

(74) *Attorney, Agent, or Firm* — Dority & Manning, P.A.

(57) ABSTRACT

A polymer composition containing a polyacetal resin, a metallic pigment, and an ultraviolet light stabilizer is disclosed that exhibits a metallic brilliant appearance. The metallic pigment, the ultraviolet light stabilizer and the polyacetal resin can be mixed in a high intensity mixer prior to being used to mold polymer articles.

30 Claims, No Drawings

(56) References Cited

FOREIGN PATENT DOCUMENTS

| | | |
|---|---|---|
| EP | 0955337 | 10/1999 |
| EP | 1522554 A1 | 4/2005 |
| JP | 52059646 A | 5/1977 |
| JP | 55-52338 | 4/1980 |
| JP | 59-86614 | 5/1984 |
| JP | 60086155 A | 5/1985 |
| JP | 60090250 A | 5/1985 |
| JP | 61-036339 | 2/1986 |
| JP | 61145245 A | 7/1986 |
| JP | 61291616 A | 12/1986 |
| JP | 62-190249 | 8/1987 |
| JP | 62201922 A | 9/1987 |
| JP | 63260949 A | 10/1988 |
| JP | 2080416 A | 3/1990 |
| JP | 02-140243 | 5/1990 |
| JP | 2024307 B | 5/1990 |
| JP | 2281046 A | 11/1990 |
| JP | 5098039 A | 4/1993 |
| JP | 6049181 A | 2/1994 |
| JP | 06-256623 | 9/1994 |
| JP | 7053770 A | 2/1995 |
| JP | 7173368 A | 7/1995 |
| JP | 7292214 A | 11/1995 |
| JP | 7331028 A | 12/1995 |
| JP | 08-120115 | 5/1996 |
| JP | 8208946 A | 8/1996 |
| JP | 08-311302 | 11/1996 |
| JP | 09-076272 | 3/1997 |
| JP | 10-182928 | 7/1998 |
| JP | 11-021376 | 1/1999 |
| JP | 11-335518 | 12/1999 |
| JP | 2000-026704 | 1/2000 |
| JP | 2000351822 A | 12/2000 |
| JP | 2001072830 A | 3/2001 |
| JP | 2001131386 | 5/2001 |
| JP | 2001-247745 | 9/2001 |
| JP | 2003-113289 | 4/2003 |
| JP | 2005-112995 | 4/2005 |
| JP | 2007-084714 | 4/2007 |
| JP | 2008-007676 | 1/2008 |
| JP | 2011-140577 | 7/2011 |
| WO | WO 2004/046244 A1 | 6/2004 |
| WO | WO 2009081517 | 7/2009 |

* cited by examiner

POLYMER COMPOSITION FOR PRODUCING ARTICLES HAVING A METALLIC APPEARANCE

RELATED APPLICATIONS

This application claims filing benefit of U.S. Provisional Patent Application Ser. No. 61/460,778, filed on Sep. 29, 2011, and which is incorporated herein by reference in its entirety.

BACKGROUND

Polyacetal polymers, which are commonly referred to as polyoxymethylenes (POMs), have become established as exceptionally useful engineering materials in a variety of applications. POMs for instance, are widely used in constructing molded parts, such as parts for use in the automotive industry and the consumer appliance industry. POMs, for instance, have excellent mechanical property, fatigue resistance, abrasion resistance, chemical resistance, and moldability.

Although polyacetal resins possess many useful properties, problems have been experienced in the past in combining the polyacetal polymers with various pigments or colorants. Polyacetal polymers, for instance, can be unstable when heated. Adding pigments and colorants to the polymer resin may increase the instability of the polymer. Pigments and colorants have also been found to have adverse effects on the properties of the resulting material.

In view of the above, those skilled in the art have attempted to combine polyacetal polymers with pigments in order to obtain molded articles with a desired appearance without adverse effects on the polymer.

For example, U.S. Pat. No. 5,096,951 discloses color stabilized polyoxymethylene molding compositions. In the '951 patent, polyoxymethylene compositions are disclosed that exhibit improved ambient and heat aged color stability by incorporating a metal deactivator into the composition. The metal deactivator can be used to produce a composition that is natural in color or may include various color pigments, such as azo dyes.

In addition to dyes, attempts have also been made in the past to incorporate metallic pigments into polyoxymethylene polymer compositions. For example, in the past, aluminum pigments have been incorporated into polyacetal polymers to produce molded parts having a satin, painted metal look, especially when molded within molds having a surface temperature of 200° F. or less. Increasing the temperature of the mold surface to greater than 200° F. has been known to increase surface gloss. Unfortunately, however, gloss increases without improving the metallic look. Thus, such parts typically achieve a glossy, but somewhat dull metallic color.

In view of the above, a need exists for a formulation and process for incorporating metallic pigments into polymer compositions, such as polyacetal polymers that can improve the overall metallic appearance of the product. In particular, a need exists for incorporating metallic pigments into polyacetal polymers that produce molded parts having an exterior surface that displays high metallic brilliance.

SUMMARY

In general, the present disclosure is directed to polyacetal compositions containing a metallic pigment. The metallic pigment is incorporated into the polymer composition in a manner such that molded products made from the composition have a high metallic brilliant appearance. For example, molded articles made according to the present disclosure have high gloss properties and a metallic appearance similar to a chrome-plated part. Products made according to the present disclosure can be used in numerous applications. For instance, products made according to the present disclosure may be used as automotive parts (such as automotive interior parts), consumer appliance parts, and the like.

In one embodiment, for instance, the present disclosure is directed to a molded polymeric article formed from a polymer composition comprising a polyacetal resin, such as a polyoxymethylene copolymer. The polyacetal resin, for instance, may be present in the polymer composition in an amount greater than about 60% by weight, such as in an amount greater than about 70% by weight, such as in an amount greater than about 80% by weight. In general, the polyacetal polymer is present in an amount less than about 98% by weight, such as in an amount less than about 95% by weight.

In accordance with the present disclosure, the polyacetal resin is combined with a metallic pigment, such as an aluminum pigment, and an ultraviolet light stabilizer. The metallic pigment and the ultraviolet light stabilizer can be combined with the polymer resin prior to forming the molded polymeric article using a high intensity mixer. It was discovered that adding the ultraviolet light stabilizer with the metallic pigment and subjecting the polymer composition to high intensity mixing prior to molding an article produces an article having an exterior surface that exhibits a gloss of greater than 45 gloss units when measured at a 60° angle using a glossmeter. For example, the exterior surface of the article may exhibit a gloss of greater than about 50 gloss units, such as greater than about 55 gloss units when measured at a 60° angle.

In one embodiment, the metallic pigment comprises plate-like particles that have an average median particle size of from about 12 microns to about 20 microns, such as from about 14 microns to about 18 microns. The metallic pigment can be present in the polymer composition in an amount from about 5% to about 15% by weight. As described above, in one embodiment, the metallic pigment comprises an aluminum pigment. The metallic particles may be polished and have a lenticular appearance.

The ultraviolet light stabilizer that may be used in the present disclosure may comprise a benzotriazol. For instance, in one embodiment, the ultraviolet light stabilizer comprises 2-(2H-benzotriazol-2-yl)4,6-bis(1-methyl-1-phenylethyl) phenol. The ultraviolet light stabilizer may be present in the composition in an amount generally less than about 2% by weight. For instance, the ultraviolet light absorber may be present in the composition in an amount greater than about 0.1% by weight, such as in an amount greater than about 0.3% by weight, such as in an amount from about 0.3% by weight to about 1% by weight.

The polymer composition may further contain various other components depending upon the particular application. In one embodiment, for instance, the polymer composition can contain a lubricant. The lubricant may comprise, for instance, a wax. In one embodiment, the lubricant may comprise N,N'ethylene bisstearamide.

Other components that may be added to the polymer composition include antioxidants, acid scavengers such as calcium citrate, a hindered amine light stabilizer, and/or a formaldehyde scavenger. The formaldehyde scavenger, for instance, may comprise a benzoguanamine. The above components may be present in the polymer composition in an amount generally less than about 2% by weight, such as in an amount less than about 1% by weight. Each of the above components, for instance, may be present in the composition in an amount greater than about 0.01% by weight, such as in an amount greater than about 0.05% by weight, such as in an amount greater than about 0.1% by weight.

In addition to the above, a processing aid and/or a nucleant may also be present in the composition. The processing aid, for instance, may comprise a polyethylene glycol, such as PEG-75 having a molecular weight of from about 3000 to about 4000.

The present disclosure is also directed to a masterbatch formed from high intensity mixing the above polymer composition. In the masterbatch, the metal pigment and the ultraviolet light stabilizer may be combined with any suitable thermoplastic resin that acts as a carrier. In one embodiment, for instance, the thermoplastic polymer resin may comprise a polyacetal resin alone or in combination with other thermoplastic polymers, such as a polyolefin. The one or more thermoplastic polymer resins contained in the masterbatch may be present in an amount generally greater than about 40% by weight, such as in an amount from about 40% by weight to about 95% by weight. The masterbatch can be used alone to produce molded polymeric articles or can be combined with greater amounts of a polyacetal polymer resin in forming articles having a metallized look with high gloss properties.

The present disclosure is also directed to a process for producing molded polymeric articles having a metallic appearance. The process includes the steps of heating and injecting the above described polymer composition into a mold. In one embodiment, the surface temperature of the mold is 200° F. or less. The polymeric article may be injection molded, blow molded or molded using any other suitable process.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to molded polymeric parts having a brilliant metallic finish. The present disclosure is also directed to a polymer composition for producing the parts and to a molding process using the composition. In general, the polymeric parts are formed from a composition containing a thermoplastic polymer, such as a polyacetal polymer, an ultraviolet light stabilizer, and a metallic pigment. In accordance with the present disclosure, the metallic pigment and the ultraviolet light stabilizer are intimately combined with a polymer resin prior to feeding the composition to a molding process for producing the molded parts. The present inventor discovered that parts having a significantly improved appearance can be formed by not only combining the metal pigment with the ultraviolet light stabilizer, but also subjecting the ultraviolet light stabilizer, the metallic pigment, and the polymer resin to a high intensity mixing process prior to molding the parts. Specifically, parts are produced according to the present disclosure that have significantly improved gloss values that produce a brilliant metallic appearance.

The metallic pigment that may be used in the present disclosure generally comprises plate-shaped particles. In one embodiment, the particles can be polished or otherwise have a high reflectivity and can be lenticular. In one embodiment, the plate-like particles can have an aspect ratio of greater than about 4:1, such as greater than about 8:1, such as from about 10:1 to about 50:1. The plate-like particles can have a median diameter of generally greater than about 12 microns, such as greater than about 14 microns. The plate-like particles can have a median diameter of generally less than about 25 microns, such as less than about 20 microns.

In one embodiment, the metallic pigment may comprise an aluminum pigment that contains elemental aluminum. The aluminum pigment, for instance, can be very thin having a thickness of less than about 1 micron and can have a median diameter as described above. In one particular embodiment, for instance, the aluminum pigment may have a median diameter of from about 12 microns to about 18 microns. The aluminum pigment can have a pronounced flop, a high brilliance and be highly reflective.

In one embodiment, the aluminum pigment can contain greater than about 80% by weight aluminum. The aluminum pigment can be present alone or in combination with other additives, such as a carrier. For instance, the aluminum pigment may be present in combination with a thermoplastic polymer, such as a polyolefin, a purified medical white oil, or may be present with a solvent, such as di-isononyl-phtalate.

As described above, the metallic pigment is combined with an ultraviolet light stabilizer prior to molding a product. The presence of the ultraviolet light stabilizer has been found to increase the gloss characteristics of the resulting part. As used herein, an ultraviolet light stabilizer comprises a material that absorbs ultraviolet light. In the past, ultraviolet light absorbers have been commonly used in polymer compositions, such as polyacetal polymer compositions in order to protect the polymer from ultraviolet light. In particular, the ultraviolet light stabilizer absorbs ultraviolet light in order to prevent the ultraviolet light from discoloring or otherwise adversely interfering with the polymer. In the present application, the ultraviolet light stabilizer not only protects the polymer, but somehow synergistically combines with the metallic pigment to improve gloss.

In one embodiment, the ultraviolet light stabilizer comprises a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g. 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g. 2-ethyl-2'-ethoxyoxanilide and 2-ethoxy-4'-dodecyloxanilide; cyanoacrylates, e.g. ethyl-α-cyano-β,β-diphenylacrylate and methyl-2-cyano-3-methyl-3-(p-methoxyphenyl)acrylate, or mixtures thereof.

In producing products in accordance with the present disclosure, the metallic pigment and the ultraviolet light stabilizer can first be combined with a carrier to produce a masterbatch that is then later used to mold products. The carrier, for instance, may comprise one or more thermoplastic polymer resins. The masterbatch can have the same composition that is used to produce a molded product or can be later combined with further amounts of a thermoplastic resin, such as a polyacetal resin, and other ingredients during melt processing to produce the molded parts.

In general, the weight ratio between the metallic pigment and the ultraviolet light stabilizer can be from about 4:1 to about 150:1. In various embodiments, for instance, the weight ratio between the metallic pigment and the ultraviolet light stabilizer is generally greater than about 5:1, such as greater than about 10:1, such as greater than about 15:1 and is generally less than about 100:1, such as less than about 80:1, such as less than about 60:1.

When forming a concentrated masterbatch that is to be combined later with greater amounts of a polymer resin, the polymer carrier in the masterbatch may be present in an amount from about 30% to about 80% by weight, such as in an amount from about 40% to about 60% by weight. As described above, the polymer resin may comprise a polyacetal resin alone or in combination with other thermoplastic polymers, such as a polyester polymer, a polyolefin polymer, and/or a liquid crystal polymer.

In other embodiments, the metallic pigment and the ultraviolet light stabilizer may be combined with one or more polymer resins in the same amounts that appear in the final product. For instance, the one or more polymer resins may be present in an amount greater than about 60% by weight, such as in an amount greater than about 70% by weight, such as in an amount greater than about 80% by weight, such as in an amount greater than about 90% by weight. In general, the one or more polymer resins are present in the polymer composition used to form molded parts in an amount less than about 96% by weight, such as in an amount less than about 95% by weight, such as in an amount less than about 94% by weight.

In producing a masterbatch or polymer composition for molding products in accordance with the present disclosure, the metallic pigment, the ultraviolet light stabilizer, the polymer resin, and various other ingredients can be first mixed together. More particularly, the components may be mixed in a manner such that the metallic pigment and the ultraviolet light stabilizer are well dispersed within the polymer resin. For example, the above three components can be mixed together in a manner that minimizes the presence of large agglomerates. In one embodiment, for instance, a high intensity mixer, as opposed to a tumble mixer, may be used to combine the components.

When subjecting the components to high intensity mixing, in one embodiment, a Henschel mixer may be used. In one embodiment, the high intensity mixing produces a shear rate of at least $10^4$ $sec^{-1}$. In one embodiment, the high intensity mixer may have a tip speed of greater than 10 m/s, such as greater than 15 m/s, such as greater than 20 m/s, such as greater than about 25 m/s. In general, the tip speed is less than about 60 m/s. As used herein, the tip speed is the tip speed of the mixing blade.

In one embodiment, the metallic pigment, the ultraviolet light stabilizer, and one or more polymer resins are fed to a single-screw or a twin-screw extruder in order to produce particles, such as pellets, that are later fed to a molding process to produce the molded products. Products can be made according to the present disclosure using extrusion molding, injection molding, blow molding, compression molding, or the like.

As described above, the present disclosure is particularly well suited to producing molded products having high metallic brilliance that are generally made from a polymer matrix that is primarily comprised of a polyacetal resin, which is also commonly referred to as a polyoxymethylene polymer. In general, any suitable polyacetal resin can be used in accordance with the present disclosure. In one particular embodiment, a polyacetal resin is used that contains a relatively low amount of formaldehyde content. For example, the polyacetal resin can have an initial formaldehyde content of less than about 1,000 ppm, such as from about 20 ppm to about 500 ppm. For example, the polyacetal resin can contain formaldehyde in an amount from about 20 ppm to about 250 ppm, such as from about 20 ppm to about 150 ppm.

The polyacetal resin may comprise a homopolymer or a copolymer and can include end caps. The homopolymers may be obtained by polymerizing formaldehyde or trioxane, which can be initiated cationically or anionically. The homopolymers can contain primarily oxymethylene units in the polymer chain. Polyacetal copolymers, on the other hand, may contain oxyalkylene units along side oxymethylene units. The oxyalkylene units may contain, for instance, from about 2 to about 8 carbon units and may be linear or branched. In one embodiment, the homopolymer or copolymer can have hydroxy end groups that have been chemically stabilized to resist degradation by esterification or by etherification.

As described above, the homopolymers are generally prepared by polymerizing formaldehyde or trioxane, preferably in the presence of suitable catalysts. Examples of particularly suitable catalysts are boron trifluoride and trifluoromethanesulfonic acid.

Polyoxymethylene copolymers can contain alongside the —$CH_2O$— repeat units, up to 50 mol %, such as from 0.1 to 20 mol %, and in particular from 0.5 to 10 mol %, of repeat units of the following formula

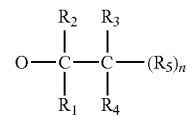

where $R^1$ to $R^4$, independently of one another, are a hydrogen atom, a $C_1$-$C_4$-alkyl group, or a halo-substituted alkyl group having from 1 to 4 carbon atoms, and $R^5$ is —$CH_2$—, —O—$CH_2$—, or a $C_1$-$C_4$-alkyl- or $C_1$-$C_4$-haloalkyl-substituted methylene group, or a corresponding oxymethylene group, and n is from 0 to 3.

These groups may advantageously be introduced into the copolymers by the ring-opening of cyclic ethers. Preferred cyclic ethers are those of the formula

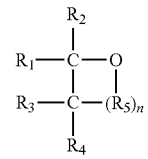

where $R^1$ to $R^5$ and n are as defined above.

Cyclic ethers which may be mentioned as examples are ethylene oxide, propylene 1,2-oxide, butylene 1,2-oxide, butylene 1,3-oxide, 1,3-dioxane, 1,3-dioxolane, and 1,3-dioxepan, and comonomers which may be mentioned as examples are linear oligo- or polyformals, such as polydioxolane or polydioxepan.

Use is also made of oxymethyleneterpolymers, for example those prepared by reacting trioxane with one of the abovementioned cyclic ethers and with a third monomer, preferably a bifunctional compound of the formula

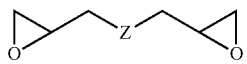

where Z is a chemical bond, —O— or —ORO— (R=$C_1$-$C_8$-alkylene or $C_2$-$C_8$-cycloalkylene).

Preferred monomers of this type are ethylene diglycide, diglycidyl ether, and diethers composed of glycidyl units and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexene diol, to mention just a few examples.

Polyacetal resins as defined herein can also include end capped resins. Such resins, for instance, can have pendant hydroxyl groups. Such polymers are described, for instance, in U.S. Pat. No. 5,043,398, which is incorporated herein by reference.

In one embodiment, the polyacetal polymer may contain hemiformal terminal groups and/or formyl terminal groups. In particular, it is believed that the methods of the present disclosure can advantageously significantly reduce formaldehyde emissions of polyacetal polymers, even when the polymers contain hemiformal terminal groups and possibly formyl terminal groups. For instance, in one embodiment, the polyacetal polymer may contain hemiformal terminal groups in amounts greater than 1.0 mmol/kg, such as in amounts greater than 1.5 mmol/kg. In an alternative embodiment, the polyacetal polymer may contain formyl terminal groups in amounts greater than 2 mmol/kg, such as in amounts greater than 2.5 mmol/kg.

The processes used to form the polyoxymethylene polymers as described above can vary depending upon the particular application. A process, however, can be used which results in a polyacetal resin having a relatively low formaldehyde content. In this regard, in one embodiment, the polymer can be made via a solution hydrolysis process as may be described in U.S. Patent Application Publication Number 2007/0027300 and/or in United States Patent Application Number 2008/0242800, which are both incorporated herein by reference. For instance, in one embodiment, a polyoxymethylene polymer containing aliphatic or cycloaliphatic diol units can be degraded via solution hydrolysis by using methanol and water with triolethylene.

Polyacetal resins or polyoxymethylenes that may be used in accordance with the present disclosure generally have a melting point of greater than about 150 degrees C. The molecular weight of the polymer can generally range from about 2,000 to about 1,000,000, such as from about 7,000 to about 150,000. The polymer can have a meltflow rate (MVR 190-2.16) from about 0.3 to about 20 g/10 min, and particularly from about 2 to about 9 g/10 min (ISO 1133).

In general, the polymer composition can contain a polyacetal polymer resin in an amount greater than about 60% by weight, such as in an amount greater than about 70% by weight, such as in an amount greater than about 80% by weight, such as in an amount greater than about 90% by weight. The polyacetal resin polymer is generally present in an amount less than about 95% by weight. As described above, other thermoplastic polymer resins may also be present in minor amounts. For instance, one or more thermoplastic polymer resins may also be present in the composition in an amount less than about 50% by weight, such as in an amount less than about 10% by weight, such as in an amount less than about 5% by weight. Such other thermoplastic resins may include polyolefin resins, polyester resins, and the like.

In addition to a polyacetal polymer resin, a metal pigment, and an ultraviolet light stabilizer, the polymer composition can also contain various other additives and components. The other additives and components may be present in a masterbatch or added later in the process.

In order to reduce formaldehyde emissions from the polymeric composition, the composition can contain a formaldehyde scavenger, such as a nitrogen containing compound. A formaldehyde scavenger is a compound that reacts and binds formaldehyde. When incorporating a nitrogen containing compound into the composition, the initial formaldehyde content of the polyacetal polymer is desirably low. For example, by using a polyacetal polymer that has an initial formaldehyde content of less than about 500 ppm, the nitrogen composition becomes well dispersed within the polymer and, in fact, has been found to solubilize within the polymer. In the past, on the other hand, when using polyacetal polymers having higher formaldehyde content, problems were experienced in getting the nitrogen containing compound into the polymer in a manner that did not interfere with other properties of the polymer. For instance, when using polyacetal polymers having higher formaldehyde content, the nitrogen containing compound may form particles within the resulting polymer matrix. In comparison, nitrogen containing compounds incorporated into compositions as described above can become finely dispersed within the resulting polymer having particle sizes less than 1 micron, or even preferably, having no distinguishable particle size.

In general, the total amount of formaldehyde scavengers present in the composition is relatively small. For instance, the formaldehyde scavengers can be present in an amount less than about 2 percent by weight, such as from about 0.01 percent to about 2 percent by weight, such as from about 0.05 percent to about 0.5 percent by weight (which excludes other nitrogen containing compounds that may be present in the composition that are not considered formaldehyde scavengers such as waxes or hindered amines). Any suitable formaldehyde scavenger can be included into the composition including, for example, aminotriazine compounds, allantoin, hydrazides, polyamides, melamines, or mixtures thereof. In one embodiment, the nitrogen containing compound may comprise a heterocyclic compound having at least one nitrogen atom adjacent to an amino substituted carbon atom or a carbonyl group. In one specific embodiment, for instance, the nitrogen containing compound may comprise benzoguanamine.

In still other embodiments, the nitrogen containing compound may comprise a melamine modified phenol, a polyphenol, an amino acid, a nitrogen containing phosphorus compound, an acetoacetamide compound, a pyrazole compound, a triazole compound, a hemiacetal compound, other guanamines, a hydantoin, a urea including urea derivatives, and the like.

The nitrogen containing compound may comprise a low molecular weight compound or a high molecular weight compound. The nitrogen-containing compound having a low molecular weight may include, for example, an aliphatic amine (e.g., monoethanolamine, diethanolamine, and tris-(hydroxymethyl)aminomethane), an aromatic amine (e.g., an aromatic secondary or tertiary amine such as o-toluidine, p-toluidine, p-phenylenediamine, o-aminobenzoic acid, p-aminobenzoic acid, ethyl o-aminobenzoate, or ethyl p-aminobenzoate), an imide compound (e.g., phthalimide, trimellitimide, and pyromellitimide), a triazole compound (e.g., benzotriazole), a tetrazole compound (e.g., an amine salt of 5,5'-bitetrazole, or a metal salt thereof), an amide compound (e.g., a polycarboxylic acid amide such as malonamide or isophthaldiamide, and p-aminobenzamide), hydrazine or a derivative thereof [e.g., an aliphatic carboxylic acid hydrazide such as hydrazine, hydrazone, a carboxylic acid hydrazide (stearic hydrazide, 12-hydroxystearic hydrazide, adipic dihydrazide, sebacic dihydrazide, or dodecane diacid dihydrazide; and an aromatic carboxylic acid hydrazide such as benzoic hydrazide, naphthoic hydrazide, isophthalic dihydrazide, terephthalic dihydrazide, naphthalenedicarboxylic dihydrazide, or benzenetricarboxylic trihydrazide)], a polyaminotriazine [e.g., guanamine or a derivative thereof, such as guanamine, acetoguanamine, benzoguanamine, succinoguanamine, adipoguanamine, 1,3,6-tris(3,5-diamino-2,4,6-triazinyl)hexane, phthaloguanamine or CTU-guanamine, melamine or a derivative thereof (e.g., melamine, and a condensate of melamine, such as melam, melem or melon)], a salt of a polyaminotriazine compound containing melamine and a melamine derivative with an organic acid [for example, a salt with (iso)cyanuric acid (e.g., melamine cyanurate)], a salt of a polyaminotriazine compound containing melamine and a melamine derivative with an inorganic acid [e.g., a salt with boric acid such as melamine borate, and a salt with phosphoric acid such as melamine phosphate], uracil or a derivative thereof (e.g., uracil, and uridine), cytosine and a derivative thereof (e.g., cytosine, and cytidine), guanidine or a derivative thereof (e.g., a non-cyclic guanidine such as guanidine or cyanoguanidine; and a cyclic guanidine such as creatinine), urea or a derivative thereof [e.g., biuret, biurea, ethylene urea, propylene urea, acetylene urea, a derivative of acetylene urea (e.g., an alkyl-substituted compound, an aryl-substituted compound, an aralkyl-substituted compound, an acyl-substituted compound, a hydroxymethyl-substituted compound, and an alkoxymethyl-substituted compound), isobutylidene diurea, crotylidene diurea, a condensate of urea with formaldehyde, hydantoin, a substituted hydantoin derivative (for example, a mono or $diC_{1-4}$ alkyl-substituted compound such as 1-methylhydantoin, 5-propylhydantoin or 5,5-dimethylhydantoin; an aryl-substituted compound such as 5-phenylhydantoin or 5,5-diphenylhydantoin; and an alkylaryl-substituted compound such as 5-methyl-5-phenylhydantoin), allantoin, a substituted allantoin derivative (e.g., a mono, di or $triC_{1-4}$ alkyl-substituted compound, and an aryl-substituted compound), a metal salt of allantoin (e.g., a salt of allantoin with a metal element of the Group 3B of the Periodic Table of Elements, such as allantoin dihydroxyaluminum, allantoin monohydroxyaluminum or allantoin aluminum), a reaction product of allantoin with an aldehyde compound (e.g., an adduct of allantoin and formaldehyde), a compound of allantoin with an imidazole compound (e.g., allantoin sodium dl-pyrrolidonecarboxylate), an organic acid salt].

The nitrogen-containing resin may include, for example, a homo- or copolymer of a polyvinylamine, a homo- or copolymer of a polyallylamine, an amino resin obtainable from a reaction by using formaldehyde (e.g., a condensation resin such as a guanamine resin, a melamine resin or a guanidine resin; a co-condensation resin such as a phenol-melamine resin, a benzoguanamine-melamine resin or an aromatic polyamine-melamine resin), an aromatic amine-formaldehyde resin (e.g., aniline resin), a polyamide resin (e.g., a homo- or copolymerized polyamide such as nylon 3 (poly-β-alanine), nylon 46, nylon 6, nylon 66, nylon 11, nylon 12, nylon MXD6, nylon 6-10, nylon 6-11, nylon 6-12, or nylon 6-66-610, a substituted polyamide containing a methylol or alkoxymethyl group), a polyesteramide, a polyamideimide, a polyurethane, a poly(meth)acrylamide, a copolymer of (meth)acrylamide and other vinyl monomer, a poly(vinyllactam), a copolymer of vinyllactam and other vinyl monomer (for example, homo- or copolymers described in Japanese Patent Application Laid-Open No. 52338/1980 (JP-55-52338A), and U.S. Pat. No. 3,204,014)), a poly(N-vinylformamide) or a derivative thereof (e.g., an N-vinylformamide-N-vinylamine copolymer) (for example, trade name "PNVE Series" manufactured by Mitsubishi Chemical Corporation), a copolymer of N-vinylformamide and other vinyl monomer, a poly(N-vinylcarboxylic acid amide), a copolymer of N-vinylcarboxylic acid amide and other vinyl monomer (for example, homo- or copolymers described in Japanese Patent Application Laid-Open Nos. 247745/2001 (JP-2001-247745A), 131386/2001 (JP-2001-131386A), 311302/1996 (JP-8-311302A) and 86614/1984 (JP-59-86614A), U.S. Pat. Nos. 5,455,042, 5,407,996 and 5,338,815), and trade names "Noniolex" and "Cleatech" manufactured by Showa Denko K.K.), and others.

The nitrogen-containing compounds may be used singularly or in combination.

In one particular embodiment, the preferred nitrogen-containing compound includes a guanamine compound (e.g., adipoguanamine, and CTU-guanamine), melamine or a derivative thereof [particularly, melamine or a melamine condensate (e.g., melam, and melem)], a guanidine derivative (e.g., cyanoguanidine, and creatinine), a urea derivative [e.g., biurea, a condensate of urea with formaldehyde, allantoin, and a metal salt of allantoin (such as allantoin dihydroxyaluminum)], a hydrazine derivative (e.g., a carboxylic acid hydrazide), a nitrogen-containing resin [e.g., an amino resin (an amino resin such as a melamine resin or a melamine-formaldehyde resin; a crosslinked amino resin such as a crosslinked melamine resin), a polyamide resin, a poly(meth)acrylamide, a poly(N-vinylformamide), a poly(N-vinylcarboxylic acid amide), and a poly(vinyllactam)]. Among them, in particular, combination use of at least one member selected from the group consisting of biurea, allantoin, a metal salt of allantoin, a carboxylic acid hydrazide and a polyamide resin, and a guanamine compound having a unit represented by the above-mentioned formula (I) can bring in significant reduction of an amount of formaldehyde generated from the shaped article.

In one embodiment, the composition may contain a nucleant. The nucleant, for instance, may increase crystallinity and may comprise an oxymethylene terpolymer. In one particular embodiment, for instance, the nucelant may comprise a terpolymer of butanediol diglycidyl ether, ethylene oxide, and trioxane. The nucleant can be present in the composition in an amount greater than about 0.05% by weight, such as greater than about 0.1% by weight. The nucleant may also be present in the composition in an amount less than about 2% by weight, such as in an amount less than about 1% by weight.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyppropionate] (Irganox 259, BASF), and 3,5-di-tert-butyl-4-hydroxytoluene (Lowinox BHT, Chemtura). Preference is given to Irganox 1010 and especially Irganox 245. The above compounds may be present in the composition in an amount less than about 2% by weight, such as in an amount from about 0.01% to about 1% by weight.

Light stabilizers that may be present in addition to the ultraviolet light stabilizer in the composition include sterically hindered amines. Hindered amine light stabilizers that may be used include oligomeric compounds that are N-methylated. For instance, another example of a hindered amine light stabilizer comprises ADK STAB LA-63 light stabilizer available from Adeka Palmarole. The light stabilizers, when present, can be included in amounts greater than about 0.1% by weight, such as in amounts greater than about 0.5% by weight, but in an amount less than about 2% by weight, such as in an amount less than about 1% by weight.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm. The composition can further include thermoplastic or thermoset polymeric additives, or elastomers such as polyethylene, polyurethane, polymethyl methacrylate, polybutadiene, polystyrene, or else graft copolymers whose core has been prepared by polymerizing 1,3-butadiene, isoprene, n-butyl acrylate, ethylhexyl acrylate, or mixtures of these, and whose shell has been prepared by polymerizing styrene, acrylonitrile or (meth)acrylates.

In one embodiment, the composition may also contain one or more lubricants. The lubricant may comprise a polymer wax composition. Lubricants that may be included in the composition include, for instance, N,N'-ethylene bisstearamide. In one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount from about 0.01% to about 5% by weight. For instance, a lubricant can be present in an amount greater than about 0.1% by weight, such as in an amount from about 0.1% to about 1% by weight. The above polyethylene glycol polymer can also be present in an amount up to about 5% by weight. For instance, the polyethylene glycol polymer can be present in an amount from about 0.1% to about 2% by weight, such as from about 0.5% to about 1% by weight.

In addition to the above components, the polymer composition may also contain an acid scavenger. The acid scavenger may comprise, for instance, an alkaline earth metal salt. For instance, the acid scavenger may comprise a calcium salt, such as a calcium citrate. The acid scavenger may be present in an amount of from about 0.01% to about 1% by weight.

The polymer composition of the present disclosure can be used to produce various molded parts. The parts can be formed through any suitable molding process, such as an injection molding process or through a blow molding process. Polymer articles that may be made in accordance with the present disclosure include knobs, door handles, automotive panels, interior automotive parts such as bezels, consumer appliance parts, and the like without limitation. In producing polymer articles according to the present disclosure, in one embodiment, the surface temperature of the mold is maintained below 200° F.

As described above, the polymer composition of the present disclosure produces molded parts having a brilliant metallic appearance. For example, parts made according to the present disclosure have high gloss characteristics. Gloss is the characteristic or attribute of an exterior surface that causes the surface to have a shiny, lustrous and/or metallic appearance. Gloss is generally dependent upon the manner in which light is reflected off of a surface. A high gloss surface generally reflects incident light primarily at the same angle at which the light is incident upon the surface. Surfaces with less gloss, for instance, have a tendency to scatter light in all directions as the light reflects off the surface.

Gloss can be measured by reflecting light off of a surface at a particular angle and then measuring reflection using a glossmeter. More particularly, gloss is measured by shining a known amount of light at a surface and quantifying the reflectance. A glossmeter directs a light at a specific angle to a test surface and simultaneously measures the amount of reflection.

Surfaces made in accordance with the present disclosure exhibit high metallic brilliance. In particular, the molded parts may exhibit a gloss of greater than about 45 gloss units when measured at a 60° angle using a glossmeter. More particularly, molded parts in accordance with the present disclosure may exhibit a gloss of greater than about 50 gloss units, such as greater than about 55 gloss units when measured at a 60° angle. In general, the surfaces exhibit a gloss of less than about 90 gloss units, such as less than about 70 gloss units, such as less than about 65 gloss units at a 60° angle. Gloss can be measured at a 60° angle according to ASTM Test D-523-08.

The present disclosure may be better understood with reference to the following example.

EXAMPLES

Various polyacetal polymer compositions were formulated containing an aluminum pigment and tested for gloss. The below polymer compositions were first blended and then fed to a twin-screw extruder and extruded into test plaques. The test plaques were then tested for gloss at an incident angle of 60° using a glossmeter.

The aluminum pigment comprised polished plate-like particles that had a median particle size of 15 microns. Six different compositions were produced. Example Nos. 1 through 5 below were each combined using a high intensity mixer to maximize dispersion. Example No. 6, on the other hand, was formulated using a tumble mixer.

| Ingredient | Example 1 Wt. % | Example 2 Wt. % | Example 3 Wt. % | Example 4 Wt. % | Example 5 Wt. % | Example 6 Wt. % |
| --- | --- | --- | --- | --- | --- | --- |
| Polyoxymethylene polymer | 90.85 | 90.67 | 90.27 | 89.77 | 89.27 | 89.27 |
| Aluminum pigment | 8 | 8 | 8 | 8 | 8 | 8 |
| Butanediol diglycidyl ether, ethylene oxide, and trioxane terpolymer (nucleant) | 0.50 | 0.50 | 0.50 | 0.50 | 0.50 | 0.50 |
| PEG-75 (average molecular weight 3350) | | | | | 0.50 | 0.50 |
| Hindered amine light stabilizer | 0.50 | 0.50 | 0.50 | 0.50 | 0.50 | 0.50 |
| Benzoguanamine | | | | 0.50 | 0.50 | 0.50 |

| Ingredient | Example 1 Wt. % | Example 2 Wt. % | Example 3 Wt. % | Example 4 Wt. % | Example 5 Wt. % | Example 6 Wt. % |
|---|---|---|---|---|---|---|
| 2-(2H-benzzotriazol-2-yl) 4,6-bis(1-ethyl-1-phenyl-ethyl)phenol (UV light stabilizer) | | | 0.40 | 0.40 | 0.40 | 0.40 |
| N,N'ethylene bisstearamide | | 0.18 | 0.18 | 0.18 | 0.18 | 0.18 |
| Tetrakis(methylene(3,5-di-tert-butyl-4 hydroxyhydro-cinnamate))methane (antioxidant) | 0.10 | 0.10 | 0.10 | 0.10 | 0.10 | 0.10 |
| Calcium Citrate | 0.05 | 0.05 | 0.05 | 0.05 | 0.05 | 0.05 |

As described above, the above formulations were tested for gloss using a glossmeter at a 60° angle. The following results were obtained:

| Example | 60° Gloss | Appearance |
|---|---|---|
| 1 | 23.9 | Satin |
| 2 | 36.8 | Satin |
| 3 | 56.7 | Brilliant |
| 4 | 56.5 | Brilliant |
| 5 | 58.9 | Brilliant |
| 6 | 20.0 | Satin |

As shown above, gloss is substantially improved when the metallic pigment is present in combination with the ultraviolet light stabilizer. In addition, gloss is substantially improved when the composition is subjected to high intensity mixing prior to being molded into an article.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A molded product having a metallized appearance comprising:
a molded polymeric article formed from a polymer composition, the polymer composition comprising a polyacetal resin present in the polymer composition in an amount greater than about 60% by weight, the polymer composition further comprising a metal pigment in the form late-like particles and an ultraviolet light stabilizer, the metal pigment and the ultraviolet light stabilizer being present in the polymer composition in amounts and being dispersed within the polymer composition to a degree sufficient for the resulting molded polymeric article to have an exterior surface that exhibits a gloss of greater than about 45 gloss units when measured at a 60° angle.

2. A molded product as defined in claim 1, wherein the exterior surface of the molded polymeric article exhibits a gloss of from about 50 gloss units to about 70 gloss units when measured at a 60° angle.

3. A molded product as defined in claim 1, wherein the metal pigment comprises an aluminum pigment, the aluminum pigment comprising plate-like particles having a median particle size of from about 12 microns to about 20 microns.

4. A molded product as defined in claim 3, wherein the aluminum pigment is present in the polymer composition in an amount from about 5% to about 15% by weight.

5. A molded product as defined in claim 1, wherein the ultraviolet light stabilizer comprises a benzotriazol.

6. A molded product as defined in claim 5, wherein the ultraviolet light stabilizer comprises 2-(2H-benzotriazol-yl) 4,6-bis(1-methyl-1-phenylethyl)phenol.

7. A molded product as defined in claim 5, wherein the ultraviolet light stabilizer is present in an amount from about 0.1% to about 2% by weight of the polymer composition.

8. An automotive trim piece for an interior comprising the molded product of claim 1.

9. A molded product as defined in claim 1, wherein the polymer composition further contains a lubricant.

10. A molded product as defined in claim 1, wherein the polymer composition further comprises an antioxidant, an acid scavenger, a hindered amine light stabilizer, and a formaldehyde scavenger.

11. A molded product as defined in claim 1, wherein the polyacetal resin comprises a polyoxymethylene copolymer.

12. A molded product as defined in claim 1, wherein the polymer composition further contains a polyethylene glycol.

13. A molded product as defined in claim 1, wherein the molded polymeric article comprises an automotive part.

14. A molded product as defined in claim 1, wherein the metal pigment comprises polished plate-like particles.

15. A polymer composition for producing molded products having a metallized appearance comprising:
at least one thermoplastic resin present in the composition in an amount of at least about 40% by weight;
a metal pigment in the form of plate-like particles, the particles having a median particle size of from about 12 microns to about 20 microns, the metal pigment being present in the composition in an amount of from about 5% to about 15% by weight;
an ultraviolet light stabilizer present in the composition in an amount from about 0.1% to about 2% by weight, the ultraviolet light stabilizer comprising a benzotriazol; and
wherein the polymer composition comprises particles or pellets comprising the metal pigment and the ultraviolet light stabilizer dispersed in the thermoplastic polymer resin, the polymer composition having been subjected to high intensity mixing.

16. A polymer composition as defined in claim 15, wherein the metal pigment comprises an aluminum pigment.

17. A polymer composition as defined in claim 15, further containing a lubricant.

18. A polymer composition as defined in claim 17, wherein the lubricant comprises N,N'ethylene bisstearamide.

19. A polymer composition as defined in claim 15, wherein the thermoplastic polymer resin comprises a polyoxymethylene copolymer.

20. A polymer composition as defined in claim 19, wherein the polyoxymethylene copolymer is present in the composition in an amount of from about 60% to about 95% by weight.

21. A polymer composition as defined in claim 15, wherein the polymer composition further contains an antioxidant and a hindered amine light stabilizer.

22. A process for producing molded products having a metallized appearance comprising:
   injecting a polymer composition into a mold, the polymer composition comprising a polyacetal resin present in the polymer composition in an amount greater than about 60% by weight, the polymer composition further comprising a metal pigment in the form of plate-like particles and an ultraviolet light stabilizer, the mold having a surface temperature of less than about 200° F.; and
   forming an article within the mold and removing the article from the mold, the molded article having an exterior surface that exhibits a gloss of greater than about 45 gloss units when measured at a 60° angle.

23. A process as defined in claim 22, wherein the polymer composition is fed to an extruder and injected into the mold as a masterbatch.

24. A process as defined in claim 22, wherein the exterior surface of the molded polymeric article exhibits a gloss of from about 50 gloss units to about 70 gloss units when measured at a 60° angle.

25. A process as defined in claim 22, wherein the metal pigment comprises an aluminum pigment having plate-like particles, the plate-like particles having a particle size of from about 12 microns to about 20 microns, the aluminum pigment being present in the polymer composition in an amount from about 5% to about 15% by weight, the ultraviolet light stabilizer comprising a benzotriazol, the ultraviolet light stabilizer being present in the polymer composition in an amount from about 0.1% to about 2% by weight.

26. A process as defined in claim 25, wherein the polymer composition further contains a lubricant.

27. A process as defined in claim 25, wherein the polymer composition further comprises an antioxidant, a hindered amine light stabilizer, and a formaldehyde scavenger.

28. A process as defined in claim 25, wherein the polyacetal resin comprises a polyoxymethylene copolymer.

29. A molded product as defined in claim 1, wherein the polymer composition further comprises a nucleant.

30. A molded product as defined in claim 1, wherein the polymer composition further comprises a polyoxyethylene terpolymer in an amount of greater than about 0.05% by weight to an amount of less than about 2% by weight.

* * * * *